UNITED STATES PATENT OFFICE.

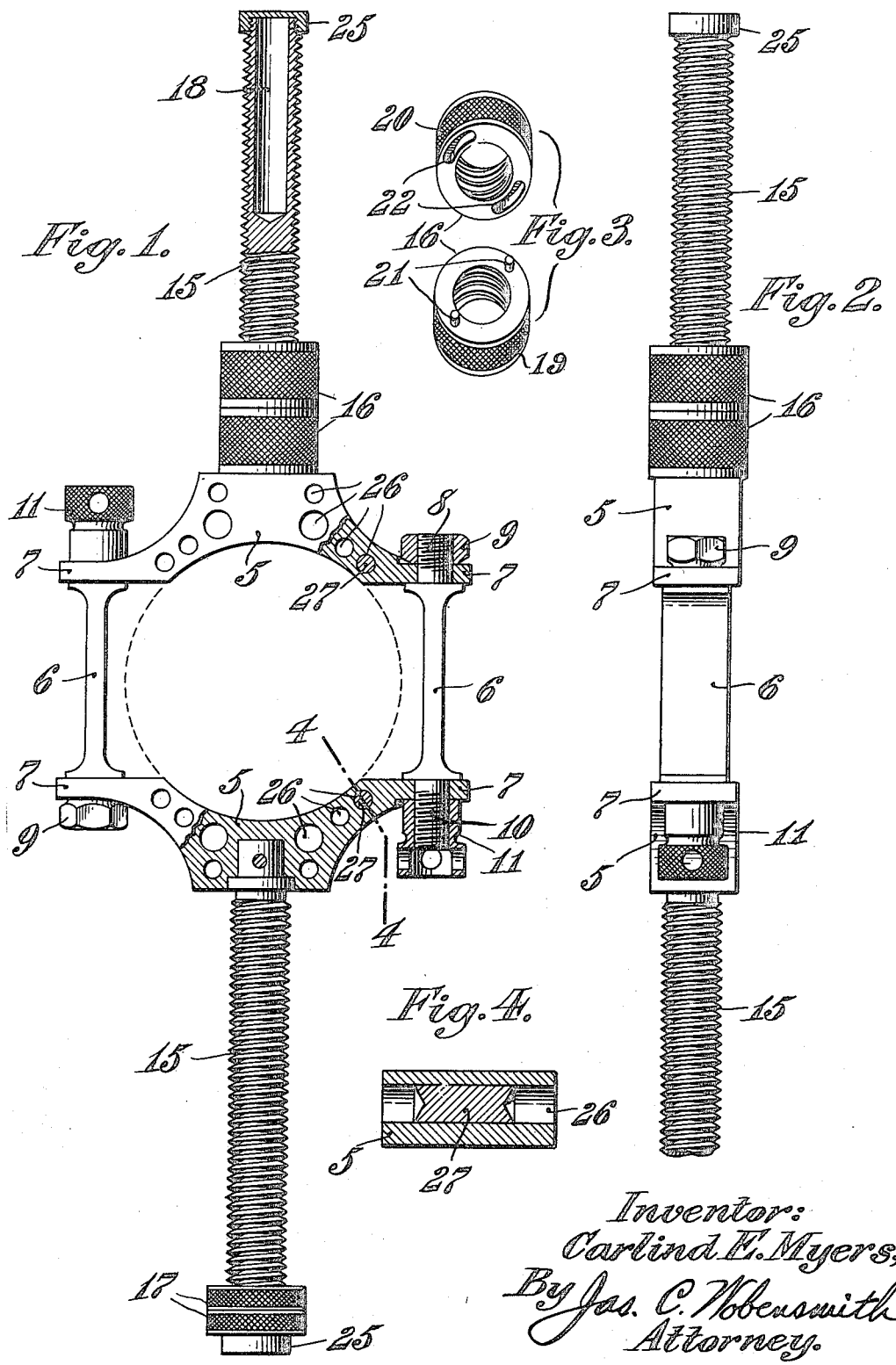

CARLIND E. MYERS, OF CAMDEN, NEW JERSEY, ASSIGNOR TO VIBRATION SPECIALTY COMPANY, OF PHILADELPHIA, PENNSYLVANIA, A CORPORATION OF DELAWARE.

BALANCING APPLIANCE.

1,305,150.  Specification of Letters Patent.  Patented May 27, 1919.

Application filed December 19, 1918. Serial No. 267,477.

*To all whom it may concern:*

Be it known that I, CARLIND E. MYERS, a citizen of the United States, residing at Camden, in the county of Camden and State of New Jersey, have invented certain new and useful Improvements in Balancing Appliances, of which the following is a specification.

My invention relates to an improved form of balancing appliance, that is to say, to an apparatus adapted to assist in ascertaining for the purpose of correction, the location and quantum of unbalance existing in a rotatable body, such, for example, as a machine element which requires, for its most efficient operation, that the mass be properly distributed so as to rotate without vibration or objectional periodic stresses caused by an unbalanced distribution of the mass.

The object therefore of my invention is to provide a simple and efficient appliance which may be readily and conveniently mounted with respect to a rotatable body, whereby the location and amount of unbalanced distribution of the mass of said rotatable body may be quickly and easily determined, and for the accomplishment of this object my invention contemplates the provision of an appliance which may be mounted adjacent the rotatable body or element under examination preferably on the shaft of said body, and which may be adjusted on said shaft both angularly and longitudinally and which is provided with radially shiftable weights of known mass, normally arranged to counterbalance each other, but which are adapted, when, shifted to the proper positions, to counter-balance any unbalanced distribution of the mass of the rotatable body under examination. My invention also contemplates the provision of means for respectively making quick and fine adjustments of the radially shiftable mass of the appliance, and my invention further contemplates, in a device of the character described, the provision of improved details of construction adding to the convenience and efficiency of the balancing operation.

The nature and characteristic features of my invention will be more readily understood from the following description, taken in connection with the accompanying drawings forming part hereof, in which;

Figure 1 is an elevational view of an appliance embodying the main features of my invention, certain parts being shown in section to more clearly illustrate details of construction;

Fig. 2 is a side elevation thereof;

Fig. 3 is a perspective view of the separated elements of a two part shiftable weight preferably employed in the appliance; and, Fig. 4 is a transverse section of a portion of the appliance, said section being taken on the line 4—4 of Fig. 1, the same illustrating means employed for bringing the appliance itself into a condition of substantially perfect static and dynamic balance.

Referring to the drawings, in the particular embodiment of my invention therein shown, 5 are saddle blocks, oppositely disposed, and adapted to be clamped on the shaft of the body to be tested for any existing static and dynamic unbalance. The saddle blocks 5 are connected to each other by means of spacer blocks 6 preferably I shaped so as to provide plane surfaces at each end to properly aline the co-acting plane surfaces of the saddle blocks 5, which are provided on the inner side of projecting ears 7 of said saddle blocks 5. The spacer blocks 6 are each provided, at one end, with the stud 8 which extends through an aperture in one of the projecting ears 7 of a saddle block 5, and is threaded at its outer end to receive a nut 9 which thus serves to clamp the projecting ear 7 of the saddle block 5 to the spacer block 6. The other end of each spacer block 6 is also provided with a stud 10 which extends through one of the ears 7 of the other saddle block 5 and is threaded on its outer end to receive a finger nut 11, which is thus adapted to clamp the other end of the spacer block 6 to the ear 7 of said other saddle block 5, but is adapted to be conveniently removed when it is necessary to separate the two saddle blocks 5 to mount the same upon the shaft of the machine element to be tested. It should be understood that normally the nuts 9 are not disturbed when mounting the device upon the shaft, but this operation is effected by loosening the finger nuts 11 merely, when the device can ordinarily be slid on the end of the shaft, or by entirely removing said nuts 11 when it is not convenient to so slip the apparatus upon the end of the shaft, and it is necessary to separate the two saddle blocks in order to mount the same in an available position on said shaft.

Each of the saddle blocks 5 carries a projecting threaded bolt 15, oppositely disposed and extending radially, and these bolts 15 are arranged to be in accurate alinement with each other, the same being secured in the saddle blocks 5 in any preferred manner. Upon each of the bolts 15 there is mounted a threaded weight, one of said weights 16 being relatively heavy and normally mounted on its bolt 15 adjacent to and abutting against the outer side of one of the saddle blocks 5, and the other of said weights 17 is mounted upon its bolt 15 at the extreme outer end thereof. The relative mass of the weights 16 and 17 may be such that their respective moments about the axis of the shaft will be equalized but this, however, is not essential and in the event that the moments of the two weights about the axis of the shaft do not correspond the difference may be compensated for by drilling out, as at 18, either or both of the projecting supporting bolts 15. The essential requirement is that when the relatively heavy weight 16 is in a predetermined position a certain distance from the axis of rotation and the relatively light weight is in a predetermined position at a distance more remote from the axis of rotation the entire assembly will be in a condition of substantially perfect static as well as dynamic balance.

Each of the shiftable weights 16 and 17 is preferably made in two parts (see Fig. 3), 19 and 20, the part 19 being provided on the surface which is adjacent the part 20 with projecting pins 21 which are adapted to extend into complemental sector slots 22 provided in the end of the member 20 which is adjacent the member 19. The pins 21 and the slots 22 are so located that when the pins 21 are at one end of their respective slots 22, the continuity of the interior threads, which are complemental to the thread of the bolt 15 will be maintained, so that the two parts of the weight may be simultaneously shifted on the threaded bolt 15 as a unit, but when a desired test position is reached, by holding one portion of the two parts weight and continuing to rotate the other portion thereof, the two parts of the composite weight will jam each other and effectively lock the weight against undesired shifting on the threaded bolt 15.

To prevent the weights from coming off the theaded bolts 15, each end of each bolt may be provided with a cap 25, which, in the instance of the lighter weight 17, will also serve to position the same at the extreme outer end of the bolt 15.

All the parts of the appliance are accurately made, calibrated and balanced, but notwithstanding that the utmost care possible may be used in the construction of the device, it may be necessary to provide means for positively securing an accurate static and dynamic balance of the assembled appliance. For this purpose the saddle blocks 5, which are preferably made of hardened steel, are provided with a number of apertures 26, extending transversely, which apertures 26 will also serve to lighten the weight of the saddle blocks, in addition to providing the feature to be now described. In any of the apertures 26 as required there may be mounted a soft steel plug 27, which may afterward be drilled out at either end to a required distance to bring the entire apparatus to a condition of substantially perfect static and dynamic balance.

The operation of the apparatus may now be readily understood. The device, as above stated, may be mounted on the end of the shaft of the machine element to be tested by first loosening the thumb nuts 11, and then, after the device is slipped on to the end of the shaft, the same may be tightened to secure the device in a desired initial position, or if there be no portion at the end of the shaft available the appliance may be separated by entirely removing the thumb nuts 11 so that the apparatus may be mounted upon the shaft in any longitudinal location that may be available. The weights 16 and 17 may then be shifted on their respective bolts 15 and locked in desired positions thereon in the manner hereinbefore described. It will be noted that the weight 16 of relatively heavy mass serves as a means of coarse adjustment, and that the relatively lighter weight 17 serves as a means of fine adjustment as the counterbalancing effect of the shifting of the weights upon their respective bolts approaches the condition of overcoming the previously existing static or dynamic unbalance, as the case may be, in the machine element being tested. It should of course be understood that the entire appliance must also be shifted angularly to successive trial positions about the axis of the rotation of the shaft, and, when the condition of substantially perfect counterbalance is reached, the operator may then, by measuring the extent which the weights 16 and 17 have been shifted from their initial positions, by noting the angular position of the appliance upon the shaft of the element under test, and also, where the test is for dynamic unbalance, by noting the longitudinal position of the appliance, determine the location and value of the existing static or dynamic balance, as the case may be, for the purpose of correcting the same either through the removal of material at permissible places or by the addition of counter-balancing weights at other places. It is of course understood by those skilled in the art that for the purpose of determining when the proper condition of counterbalance has been reached through the use of the appliance, this condition may be rendered more perceptible by mounting the machine element under test in vibratory supports or bearings, which also, if desired, may be synchronized as to their periods of oscillation with the speed of rotation of the machine element being tested.

Having thus described the nature and characteristic features of my invention what I claim as new and desire to secure by Letters Patent is:

1. A balancing appliance adapted to be adjustably mounted adjacent a rotatable body under examination to determine the unbalance existing in said body, said appliance including a plurality of shiftable weights each of different mass and each arranged at a different initial distance from the axis of rotation of said body, the appliance being in static and dynamic balance when said weights are in their initial positions.

2. A balancing appliance adapted to be adjustably mounted adjacent a rotatable body under examination to determine the unbalance existing in said body, said appliance including a plurality of shiftable weights each of different mass and each arranged at a different inital distance from the axis of rotation of said body, and means for locking said weights in desired locations, the appliance being in static and dynamic balance when said weights are in their initial positions.

3. A balancing appliance adapted to be adjustably mounted upon a rotatable shaft adjacent a body under examination to determine the unbalance existing in said body, said appliance including a plurality of shiftable weights each of different mass and each arranged at a different initial distance from the axis of rotation of said shaft, the appliance being in static and dynamic balance when said weights are in their initial positions.

4. A balancing appliance adapted to be adjustably mounted upon a rotatable shaft adjacent a body under examination to determine the unbalance existing in said body, said appliance including a plurality of shiftable weights each of different mass and each arranged at a different initial distance from the axis of rotation of said shaft, and means for locking said weights in desired locations, the appliance being in static and dynamic balance when said weights are in their initial positions.

5. A balancing appliance adapted to be adjustably mounted upon a rotatable shaft adjacent a body under examination to determine the unbalance existing in said body, said appliance including a pair of oppositely disposed shiftable weights each of different mass and each arranged at a different initial distance from the axis of rotation of said shaft.

6. A balancing appliance adapted to be adjustably mounted upon a rotatable shaft adjacent a body under examination to determine the unbalance existing in said body, said appliance including a pair of oppositely disposed shiftable weights each of different mass and each arranged at a different initial distance from the axis of rotation of said shaft, the appliance being in static and dynamic balance when said weights are in their initial positions.

7. A balancing appliance adapted to be adjustably mounted upon a rotatable shaft adjacent a body under examination to determine the unbalance existing in said body, said appliance including a pair of oppositely disposed shiftable weights each of different mass and each arranged at a different inital distance from the axis of rotation of said shaft, and means for locking said weights in desired locations, the appliance being in static and dynamic balance when said weights are in their inital positions.

8. A balancing appliance adapted to be adjustably mounted adjacent a rotatable body under examination to determine the unbalance existing in said body comprising means for adjustably clamping the same to a portion of the body, a pair of radially extending bolts oppositely disposed and arranged in alinement with each other, a weight of known mass shiftably mounted on each of said bolts and each having an initial position in which the entire appliance is in static and dynamic balance.

9. A balancing appliance adapted to be adjustably mounted adjacent a rotatable body under examination to determine the unbalance existing in said body comprising means for adjustably clamping the same to a portion of the body, a pair of radially extending bolts oppositely disposed and arranged in alinement with each other, a weight of known mass shiftably mounted on each of said bolts and each having an initial position in which the entire appliance is in static and dynamic balance, and said weights having means for locking the same in desired shifted positions.

10. A balancing appliance adapted to be adjustably mounted adjacent a rotatable body under examination to determine the unbalance existing in said body comprising means for adjustably clamping the same to a portion of the body, a pair of radially extending bolts oppositely disposed and arranged in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, and the entire appliance being in static and dynamic balance when said weights are in their positions.

11. A balancing appliance adapted to be adjustably mounted adjacent a rotatable body under examination to determine the unbalance existing in said body comprising means for adjustably clamping the same to a portion of the body, a pair of radially extending bolts oppositely disposed and arranged in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, said weights having means for locking the same in desired shifted positions, and the entire appliance being in static and dynamic balance when said weights are in their initial positions.

12. A balancing appliance adapted to be adjustably mounted upon a rotatable shaft adjacent a body under examination to determine the unbalance existing in said body comprising means for adjustably clamping the same to the shaft, a pair of radially extending bolts oppositely disposed and arranged in alinement with each other, a weight of known mass shiftably mounted on each of said bolts and each having an initial position in which the entire appliance is in static and dynamic balance.

13. A balancing appliance adapted to be adjustably mounted upon a rotatable shaft adjacent a body under examination to determine the unbalance existing in said body comprising means for adjustably clamping the same to the shaft, a pair of radially extending bolts oppositely disposed and arranged in alinement with each other, a weight of known mass shiftably mounted on each of said bolts and each having an initial position in which the entire appliance is in static and dynamic balance, and said weights having means for locking the same in desired shifted positions.

14. A balancing appliance adapted to be adjustably mounted upon a rotatable shaft adjacent a body under examination to determine the unbalance existing in said body comprising means for adjustably clamping the same to the shaft, a pair of radially extending bolts oppositely disposed and arranged in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, and the entire appliance being in static and dynamic balance when said weights are in their initial positions.

15. A balancing appliance adapted to be adjustably mounted upon a rotatable shaft adjacent a body under examination to determine the unbalance existing in said body comprising means for adjustably clamping the same to the shaft, a pair of radially extending bolts oppositely disposed and arranged in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, said weights having means for locking the same in desired shifted positions, and the entire appliance being in static and dynamic balance when said weights are in their initial positions.

16. A balancing appliance adapted to be adjustably mounted upon a rotatable shaft adjacent a body under examination to determine the unbalance existing in said body comprising a pair of oppositely disposed saddle blocks having means for adjustably clamping the same to the shaft, a radially extending bolt carried by each of said saddle blocks, said bolts being oppositely disposed in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, and the entire appliance being in static and dynamic balance when said weights are in their initial positions.

17. A balancing appliance adapted to be adjustably mounted upon a rotatable shaft adjacent a body under examination to determine the unbalance existing in said body comprising a pair of oppositely disposed saddle blocks having means for adjustably clamping the same to the shaft, a radially extending bolt carried by each of said saddle blocks, said bolts being oppositely disposed in alinement with each other, a weight of known mass shiftably mounted on one of said bolts and having an initial position relatively near the axis of rotation, a weight of a known but less mass shiftably mounted on the other of said bolts and having an initial position more remote from the axis of rotation, said weights having means for locking the same in desired shifted positions, and the entire appliance being in static and dynamic balance when said weights are in their initial positions.

In testimony whereof I have hereunto signed my name.

CARLIND E. MYERS.